US006944176B1

(12) United States Patent
Brown et al.

(10) Patent No.: US 6,944,176 B1
(45) Date of Patent: Sep. 13, 2005

(54) METHOD AND APPARATUS FOR BIT LEVEL NETWORK DATA MULTIPLEXING

(75) Inventors: Scott Brown, Wake Forest, NC (US); Brad Peabody, Raleigh, NC (US); Gary Pollard, Wendell, NC (US); Milton Hotard, Knightdale, NC (US); Rod Washington, Raleigh, NC (US); Barry Rodgers, Raleigh, NC (US)

(73) Assignee: Square D Company, Palatine, IL (US)

( * ) Notice: Subject to any disclaimer, the term of this patent is extended or adjusted under 35 U.S.C. 154(b) by 774 days.

(21) Appl. No.: 09/686,178

(22) Filed: Oct. 11, 2000

(51) Int. Cl.[7] .......................... H04L 12/40; H04L 12/50
(52) U.S. Cl. ...................................... 370/438; 370/362
(58) Field of Search ................................. 370/438–440, 370/362, 434, 428, 429, 442, 458, 468–470, 419–421, 462, 463; 710/36, 45, 100; 340/825.21, 825.67, 825.65, 825.57, 825.52

(56) References Cited

U.S. PATENT DOCUMENTS

| | | | | |
|---|---|---|---|---|
| 4,479,179 A | * | 10/1984 | Dinwiddie, Jr. ............. | 710/25 |
| 5,329,525 A | * | 7/1994 | Sakagami ................... | 370/389 |
| 5,524,007 A | * | 6/1996 | White et al. ................ | 370/419 |
| 5,615,211 A | * | 3/1997 | Santore et al. ............. | 370/419 |
| 5,796,739 A | * | 8/1998 | Kim et al. .................. | 370/401 |
| 5,854,454 A | * | 12/1998 | Upender et al. ............ | 187/247 |
| 5,907,539 A | * | 5/1999 | Riley ........................ | 370/282 |

* cited by examiner

Primary Examiner—Chau Nguyen
Assistant Examiner—Ian Moore

(57) ABSTRACT

A system and method for data table multiplexing on a serial multiplex data (bit level) system is described. The present invention combines the benefits of previous systems with the capability to transfer large tables of data. The method used to transfer this data is a software data multiplexing protocol that utilizes the previous physical layer protocol and is capable of coexisting with previous systems. Multiple bit addresses are assigned functions such as address, data, and error detection. This establishes a data transfer frame that is used to multiplex data between a host and a module. Communication to and from the host is accomplished through the register map. The register map contains module setup information, software configuration settings, raw data, or summary data.

2 Claims, 7 Drawing Sheets

METHOD AND APPARATUS FOR BIT LEVEL NETWORK DATA MULTIPLEXING

BACKGROUND OF THE INVENTION

1. Field of Invention

This invention relates generally to the field of control systems. More particularly this invention relates to control systems using data link modules communicating on a serial time-division multiplex bus capable of transferring large amounts of complex data.

2. Description of the Related Art

Serial multiplexed data systems, or bit level networks, capable of communicating single bit and variable length words, are well known as described in U.S. Pat. No. 4,808,994, issued on Feb. 28, 1989, and U.S. Pat. No. 5,706,289 issued on Jan. 6, 1998, both to Robert E. Riley, incorporated herein by reference.

The previous systems have benefits that include low cost, the use of only four wires for power and communication, and efficient data transfer. However, these bit level networks have traditionally been limited to transferring discrete input and output status data and some limited analog values. In the bit level networks of the prior art, data is transmitted in a unit termed a scan. A scan consists of a data frame for each available data channel prefaced by a synchronizing signal.

The data frame generally consists of a predetermined number of bits, typically 512 bits, which contains commands and data positioned within the data frame to coincide with the frame address boundaries configured in the modules. After receiving the synchronizing signal, each module watches for the command/data located at the proper position of the proper channel corresponding to the frame address and channel number configured for that module.

Often it is desirable to transfer large amounts of complex data containing information about a remote piece of equipment back to a central control station. Examples of such desirable information includes, but is not limited to, vibration, temperature, motor current, and voltage waveform data. These bit level network systems described by Riley provide efficient transfer of binary data and word data but are not cabable of transferring large amounts of data to limited addressing capabilities.

Accordingly, there is a need for a system and method for transferring large amounts of complex data across a bit level network. Further, there is a need to retain the simplicity, cost effectiveness, and reliability of the prior art bit level network while accomplishing the transfer of large amounts of complex data.

BRIEF SUMMARY OF THE INVENTION

A system and method for data table multiplexing on a serial multiplex data system is described. The method used to transfer this data is a software data multiplexing protocol that utilizes the previous physical layer protocol and is capable of coexisting with previous systems.

Multiple bit addresses within a time multiplexed data stream are assigned functions such as register number, data, and error detection. This establishes a data transfer frame that is used to multiplex data between a host and a module. The module includes a section of random access memory used as a register map. Communication to and from the host is accomplished through the register map. This map contains module setup information, software configuration settings, raw data, and summary data. Commands are sent from the host to the module and the module responds accordingly. The host commands the module to read registers from its map and respond with the stored register values or to write registers with the values sent. Registers are designated in the module as read only, write only, or read/write. This facilitates data protection methods.

The incorporation of error detection and correction means increase the reliability of the system. Predetermined responses to detected errors result in predetermined actions. Some register addresses or data values are designated to indicate the detection of an error or request retransmission of a command or a response.

BRIEF DESCRIPTION OF THE SEVERAL VIEWS OF THE DRAWINGS

The above-mentioned features of the invention will become more clearly understood from the following detailed description of the invention read together with the drawings in which:

FIG. 5b is a continuation of the flow diagram of FIG. 5a.

DETAILED DESCRIPTION OF THE INVENTION

A method and apparatus for data table multiplexing on a serial multiplex data system is described. The method used to transfer this data is a software data multiplexing protocol that utilizes the previous physical layer protocol and is capable of coexisting with previous systems. Multiple bit addresses within a time multiplexed data stream are assigned functions such as register number, data, and error detection. This establishes a data transfer frame that is used to multiplex data between a host and a module.

Figure 1:
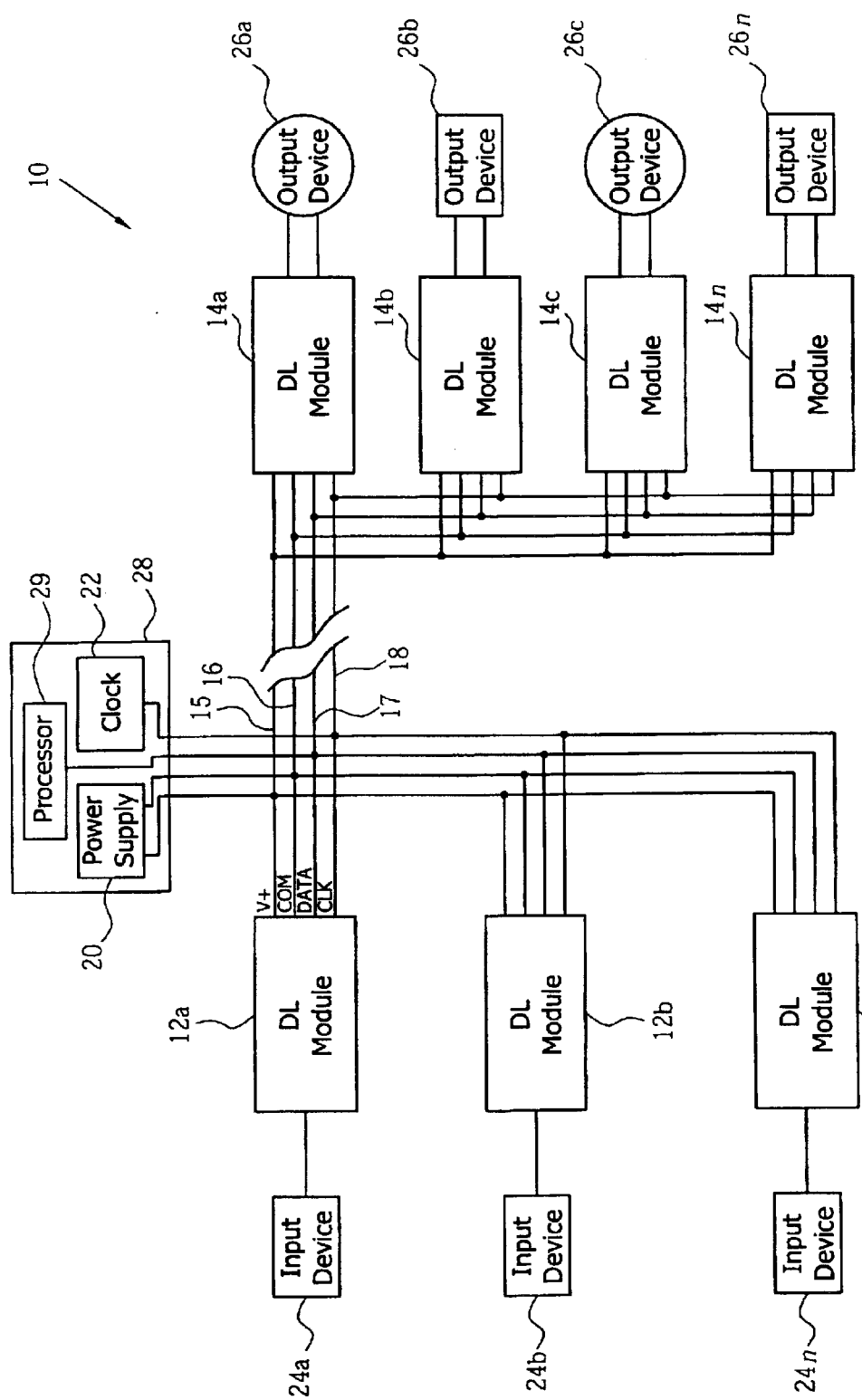
FIG. 1 is a schematic block diagram of an overall system incorporating the present invention.

FIG. 1 illustrates a schematic of a typical serial multiplexed network system 10 allowing the transfer of large amounts of complex data according to the present invention. The system includes a plurality of control data link modules 12a, 12b, . . . 12n and a plurality of controlled data link modules 14a, 14b, 14c, . . . 14n. To indicate a variability of the number of modules, the element numbers form a series with n representing a variable end to the series. Those skilled in the art will recognize that the number of control and controlled modules is selected on the basis of input and output devices to be serviced and that number may vary without interfering with the advantages of the present invention. The system also includes an interconnecting cable generally having four conductors: a DC supply voltage conductor 15 and a common conductor 16 connected to a main power supply 20, a data bus conductor 17, and a clock pulse conductor 18 connected to a clock pulse source 22. The power supply 20 and clock 22 can be located in a host 28, such as a PC or similar device having a processor 29. Each conductor 15–18 is connected to each module 12, 14 in any desired network topography. The order or arrangement of the interconnection is of no consequence. The system further includes a plurality of input devices 24a, 24b, . . . 24n, one connected to each control module 12, and a plurality of output devices 26a, 26b, 26c, . . . 26n, one connected to each controlled module 14.

In the illustrated embodiment, the DC supply voltage conductor 15 and the common conductor 16 are connected to a single power supply 20 which furnishes power to all of the modules 12, 14. Those skilled in the art will recognize that it may be desirable to provide multiple power supplies, each servicing a different group of modules 12, 14.

Figure 2:
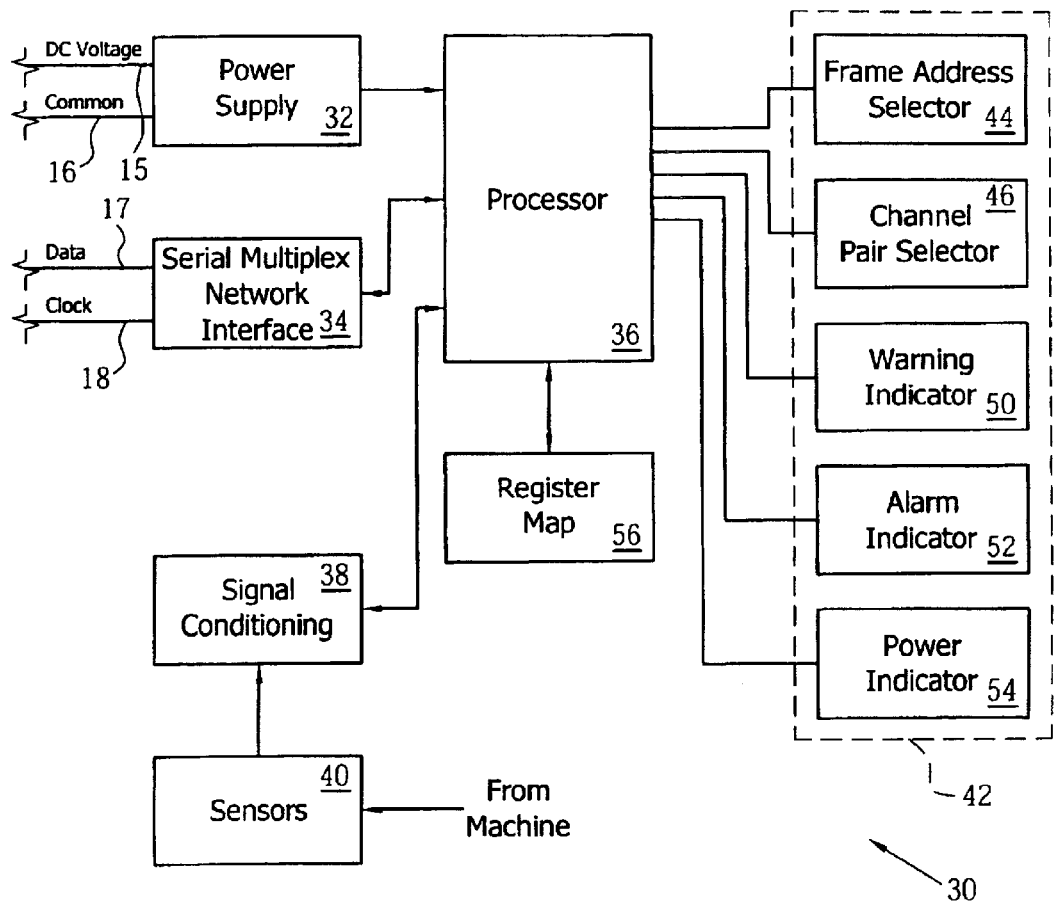
FIG. 2 is a schematic block diagram of an individual data link module usable in the system of FIG. 1.
Figure 2:
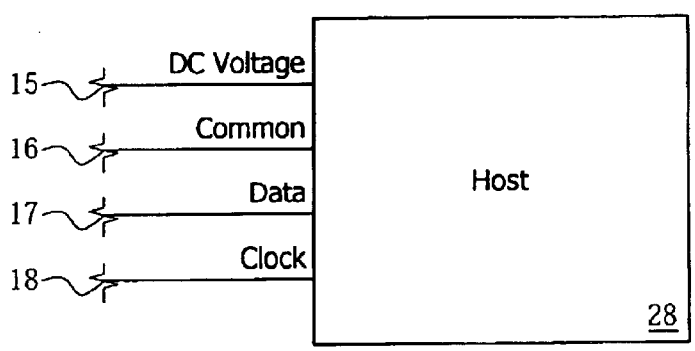

Further those skilled in the art will recognize that the common conductor 16 can be eliminated where a common ground between the modules 12, 14 is otherwise readily available. FIG. 2 generally illustrates the host 28 and a representative module 30, selected from the group of modules 12 and 14, capable of transferring large amounts of complex data across the system 10 of FIG. 1. The host 28 acts as a master to the slave module 30. The host 28 and the module are not shown directly connected to indicate some distance of separation between the host 28 and module 30. Those skilled in the art will recognize that this distance can be a few feet or a distance approaching the signal limits of the serial multiplexed data system bus.

The module 30 includes an internal power supply 32 connected to the direct current supply voltage conductor 15 and the common conductor 16. The internal power supply 32 provides the various supply voltages required by the various components of the module 30.

The module 30 communicates with the serial multiplexed data system bus 17 using basic signal conditioning circuitry via a serial multiplexed network interface 34. The interface connects signals from the data bus 17 to a synchronous serial port on a processor 36. Those skilled in the art will recognize that the processing device can be any known logic device.

The module 30 includes a signal conditioning circuit 38 which serves to interface the module 30 with an input or output device, 24 or 26 respectively. In the illustrated embodiment, the signal conditioning device 38 is responsive to at least one sensor 40 for measuring data from an associated device (not shown). Those skilled in the art will recognize that sensors 40 monitoring any number of items of interest can be incorporated within or connected to the module 30, provided sufficient storage for the acquired data is available. For example, a motor monitor may include sensors to monitor motor acceleration and motor temperature. The signal conditioning circuit 38 conditions the measurements obtained from the sensor 40 and monitors for loss of signal at the sensor 40. As the sensors typically provide analog data, the signal conditioning circuit 38 converts the analog data to digital data and passes the digital data to the processor 36 for storage and transmission. Those skilled in the art will recognize that the input or output device, 24 or 26 respectively, can be a controller, indicator, or other device which accepts a signal from the module 30 without interfering with the advantages of the present invention.

The module 30 includes a user input/output (I/O) interface 42 which allows the operator to configure the module 30 and to check the status of the module 30. In one embodiment, the module 30 occupies thirty-two consecutive addresses on a first multiplexed channel 31 of a preselected channel set 33, at a position known as the frame address 35, and thirty-two consecutive addresses on the next consecutive or another multiplexed channel 37 of the preselected channel set 33 for a total of sixty-four addresses. Those skilled in the art will recognize that the number of consecutive addresses can vary without interfering with the advantages of the present invention. The frame addresses 35 on the two multiplexed channels 31 and 37 are the same. Those skilled in the art will recognize that while a consecutive channel pair 33 is discussed, a set of any number of preselected channels 33 to transport more than two data segments can be used at the expense of the number of accessible devices without interfering with the advantages of the present invention.

The frame address 35 and the channel pair or channel set 33 for the module 30 must be configured. In the illustrated embodiment, the user I/O interface 42 includes two input devices and three output devices. The input devices include a frame address selector 44 and a channel pair or channel set selector 46. While the illustrated embodiment of the input devices 44, 46 common to serial multiplexed data systems is described below, those skilled in the art will recognize other embodiments which may be used without interfering with the advantages of the present invention. The output devices include a warning indicator 50, an alarm indicator 52, and a power indicator 54. In one embodiment, the output indicators 50, 52, 54 are color coded light emitting diodes which can be sequenced to flash indicating a specific message. Those skilled in the art will recognize that other output indicators could be used without interfering with the advantages of the present invention.

In one embodiment, the configuration of the module 30 is accomplished using a dual inline package (DIP) switch having at least eight positions. As there are eight possible multiplex channel pairs, three positions of the DIP switch are used. The first frame address 35 of each multiplexed channel, 31 and 37 for instance, contains information relating to the multiplex address of that channel. Accordingly, there are seven allowed serial multiplexed frame addresses 35 for each multiplexed channel, such as channels 31 and 37. The frame addresses 35 begin on 32-bit boundaries with the first allowed address for a module 30 being address 32. The last sixteen addresses occupied by the module 30 contain the Complementary Data Retransmission (CDR) check word. The frame address range is set using at least three positions on the DIP switch thereby providing for the selection of all available frame address ranges.

Finally, the module 30 includes a section of random access memory used as a register map 56. Communication to and from the host 28 is accomplished 56 through the register map 56. The register map 56 contains module setup information, software configuration settings, raw data, and summary data. Commands are sent from the host 28 to the module 30 and the module 30 responds accordingly.

The host 28 can command the module 30 to read a register 57 from the register map 56 and respond with the values from that register or to write to a register 57 the values sent. Registers 57 in the module 30 can be designated as read only, write only, or read/write, thereby facilitating data protection methods. Those skilled in the art will recognize that a microcontroller, or other suitable processing device, could be substituted for the processor 36 and the register map 56 without interfering with the advantages of the present invention.

Figure 3A:
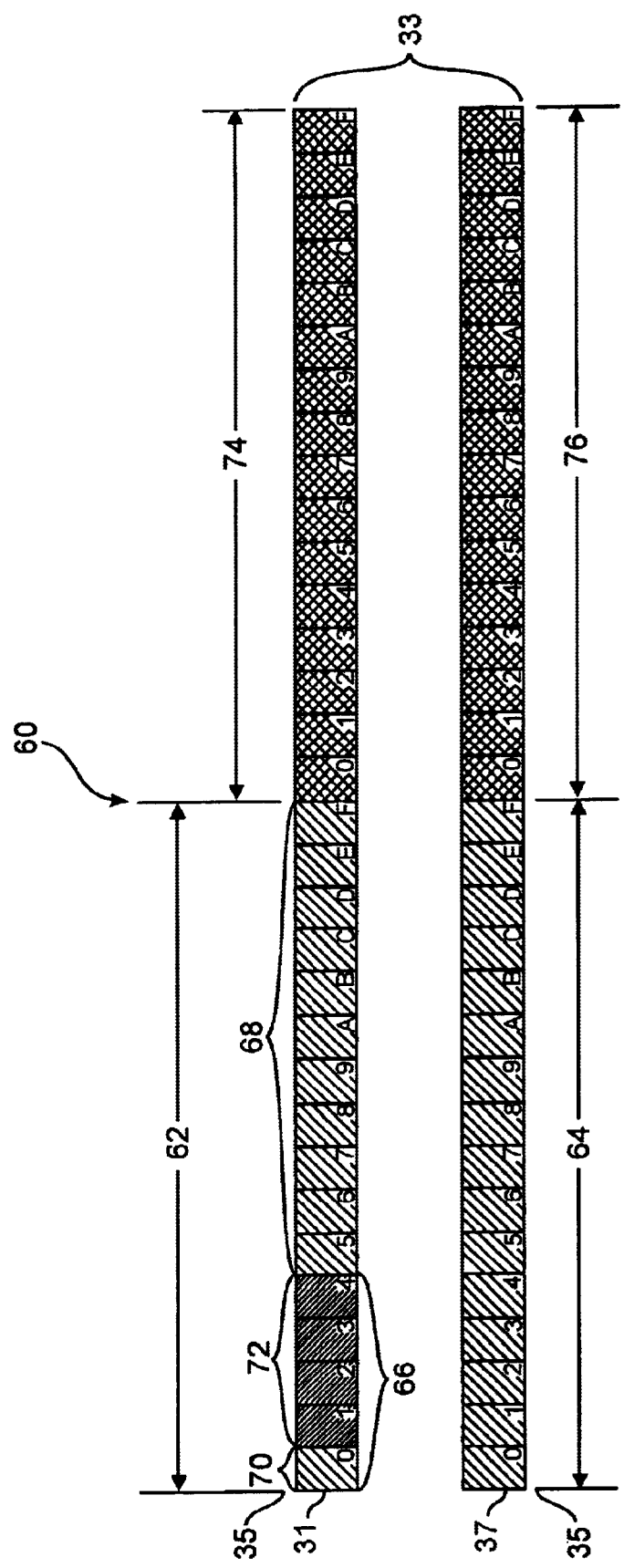
FIG. 3a is a bitwise representation of a message communicated using the system of FIG. 1.

FIG. 3a illustrates a bitwise representation of one embodiment of a multi-bit message 60. The message 60 includes a 16-bit Command for Module message segment 62 and a 16-bit Data for Module message segment 64, each starting at the same frame addresses 35 on sequential or preselected multiplexed channel sets 33. The Command for Module (CFM) message segment 62 appears on the first multiplexed channel 31 of the preselected multiplexed channel set 33. The Data For Module (DFM) message segment 64 appears on the sequential or next multiplexed channel 37 of the preselected multiplexed channel set 33. The format for both the CFM 62 and the DFM 64 is defined for each register 57 being addressed (bit, signed, unsigned, etc.). The bus data is from the least significant bit (LSB) to the most significant bit (MSB) with the LSB being the lowest serial multiplexed data system address. Each message segment 62, 64 is duplicated with CDR data check segments, 74 and 76 respectively, thereby making up the full 64-bit message 60.

The 16-bit CFM includes five command bits, or operator, 66 followed by eleven bits containing the operand 68, the number of the register 57 within the module 30 to be acted upon. Specifically, the command bits 66 include a first bit, setting whether the command is a read request or a write request, the read/write request bit 70, and four bits which are unused 72. Those skilled in the art will recognize that the unused bits 72 could be used to implement a CRC checksum for the operand 68, if desired, without interfering with the advantages of the present invention.

Figure 3B:
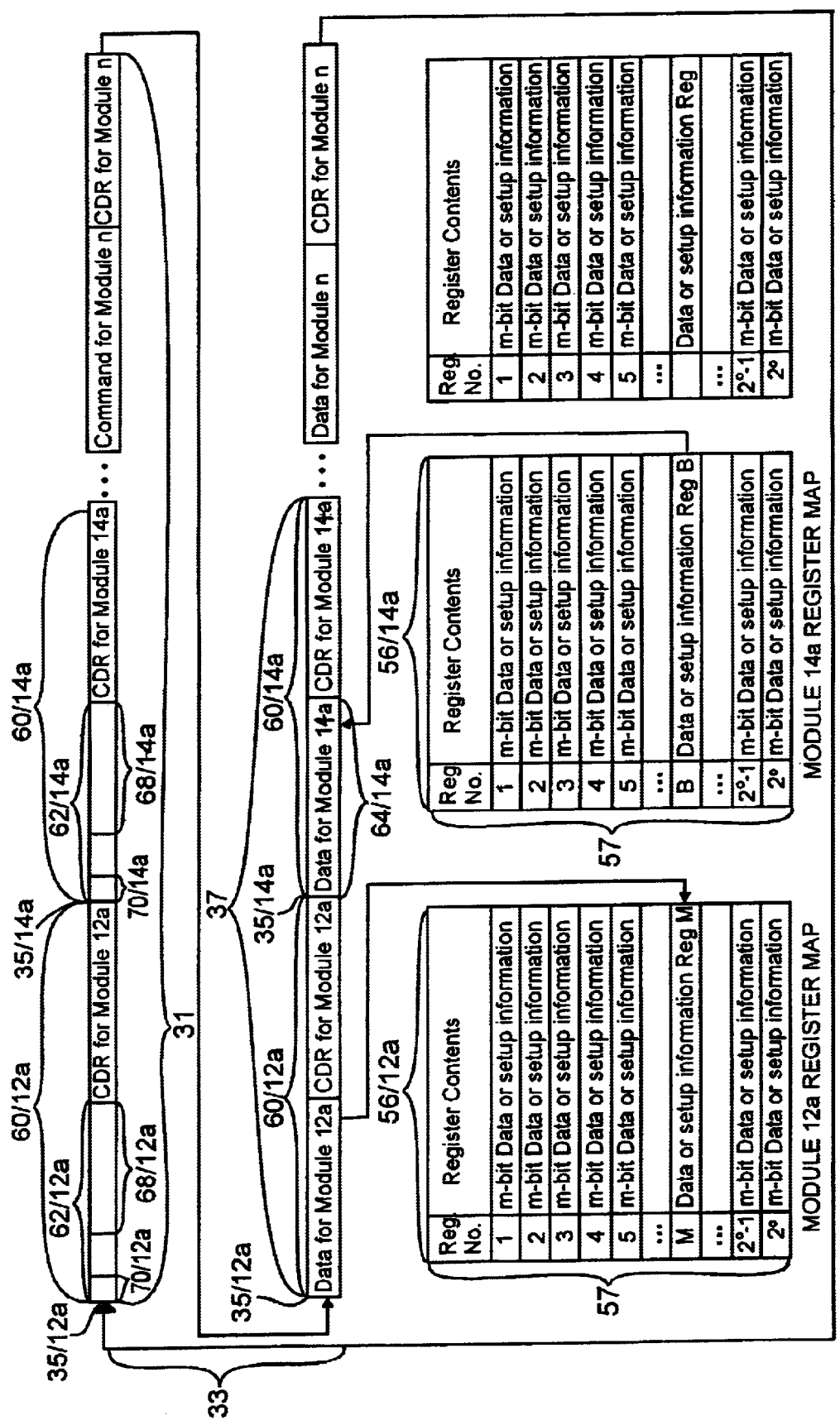
FIG. 3b illustrates the data stream of multiple multi-bit messages on the bit level network of FIG. 1.

FIG. 3b illustrates the data stream of multiple multi-bit messages 60 being sent between the host 28 and more than one module 30 on the bit level network 10 as shown and connected in FIG. 1. FIG. 3b represents the data stream during one scan of all the multiplexed channels on the network 10. For simplicity, only two modules, 12a and 14a, will be discussed in this model, module n is shown to indicate that other modules 30 could be on the same preselected channel set 33. Modules 12a and 14a are each configured to a particular frame address, 35/12a and 35/14a respectively, on the selected channel set 33. Over the data line 17, the host 28 sends message 60/12a to module 12a and message 60/14a to module 14a. The command segments 62/12a and 62/14a of associated messages 60/12a and 60/14a each start at the their respective frame addresses, 35/12a and 35/14a, on the first channel 31 of the preselected channel set 33.

For this discussion, the read/write bit 70/12a of message 35/12a will be set to "WRITE" and the operand 68/12a will be register number "M". The read/write bit 70/14a of message 35/14a will be set to "READ" and the operand 68/14a will be register number "B". The data segments 64/12a and 64/14a of associated messages 60/12a and 60/14a each start at the their respective frame addresses, 35/12a and 35/14a, on the second channel 37 of the preselected channel set 33. On the second channel 37 of the preselected channel select-module 12a will "WRITE" the data received during data segment 64/12a into register number "M" of module 12a's register map 56/12a and module 14a will "READ" data from register number "B" of it's register map 56/14a and place that data on the network during data segment 64/14a.

Figure 4:
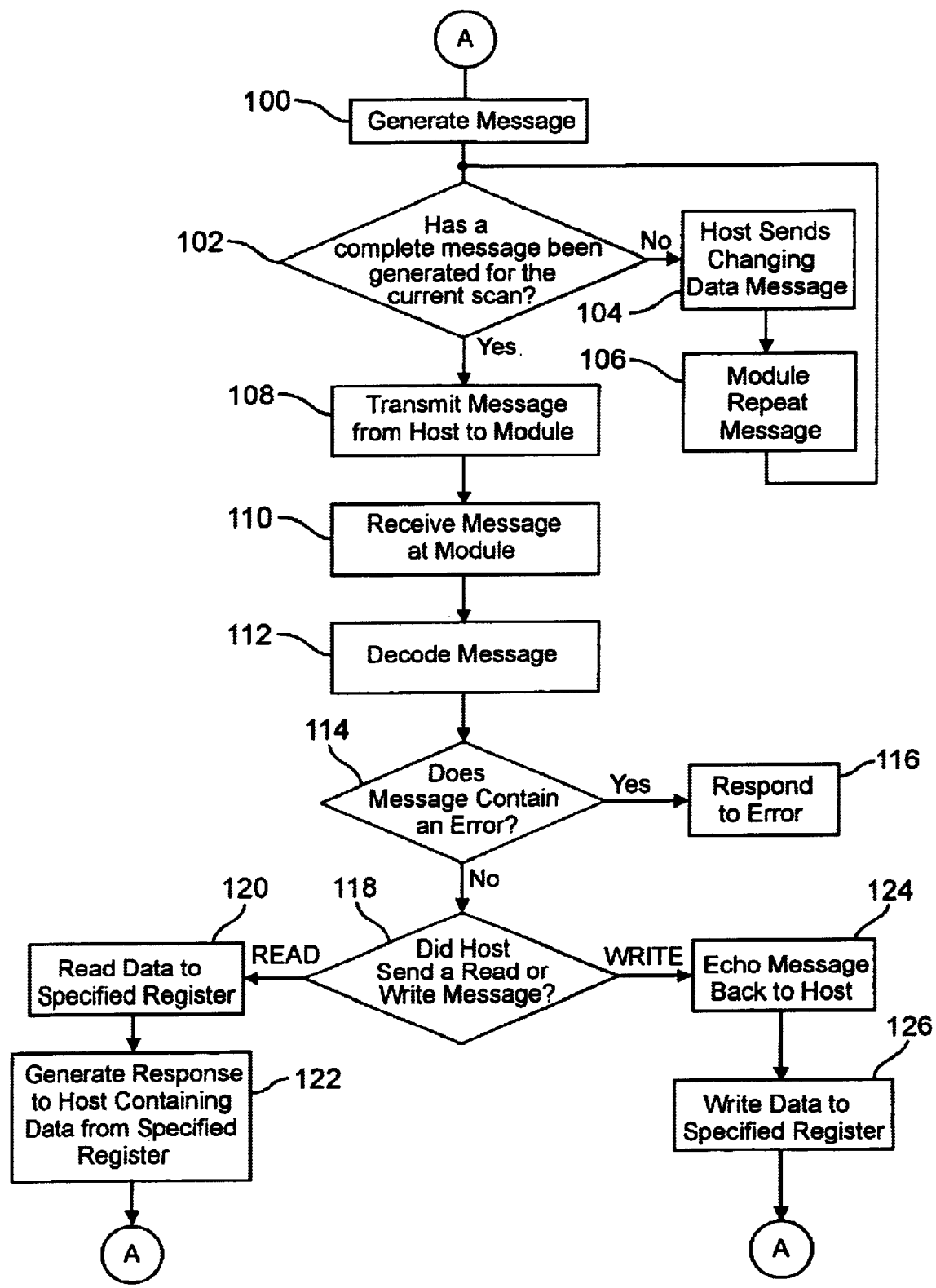
FIG. 4 is a flow diagram of the communication between a host and a module.

FIG. 4 is a flow diagram of the communications between the host 28 and the module 30. The host begins generating a message for the module in step 100. When communicating from the host 28 to the module 30, the host 28 expects a response to the command during the next complete scan of the module 30 following the scan transmitting the message 60. If the host 28 cannot ensure that it can change all 32-bits of the message 60 it is sending in one scan, as shown in step 102, the host 28 sends a changing data indicator step 104, in the CFM 62 while altering the DFM 64. In one embodiment, the changing data indicator is the command 0xFFFF. The module 30 echoes the message 60, step 106, if it receives a changing data indicator in the CFM 62. The host 28 supports CDR on this command as well. A complete message 60 is transmitted from the host 28 to the module 30 in step 108.

The module 30 receives the message 60 from the host 28 in step 110. The message is decoded and the CDR verified in step 112. The decoded message 60 is checked to ensure that it is not corrupt and does not contain errors in step 114.

If the message 60 is corrupt or contains errors, then appropriate remedial actions are taken in step 116. The CFM 62 is parsed to determine whether the message 60 is a read or write request from the host 28. For a read command, the module 30 reads the contents of the specified register in step 120 and responds with a message 60 containing the contents of the requested register on the next scan of the module 30 in step 122. The module 30 responds to a write command from the host 28 by passing the entire received message 60 back to the host 28 in step 124 and the specified register is updated with the contents of the DFM 64 in step 126.

Figure 5A:
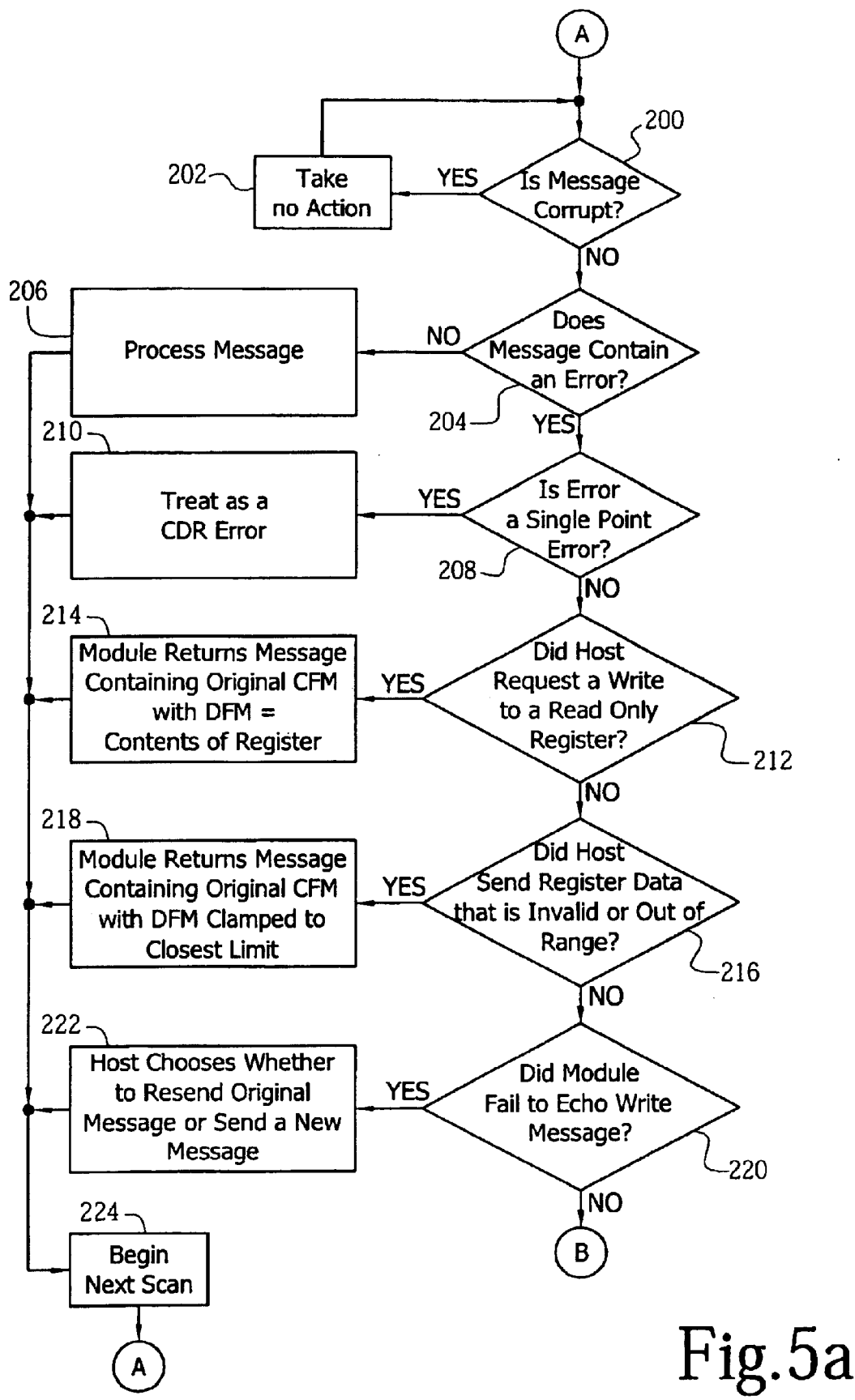
FIG. 5a is a flow diagram of the response to an error in a message transmitted between a host and a module.
Figure 5B:
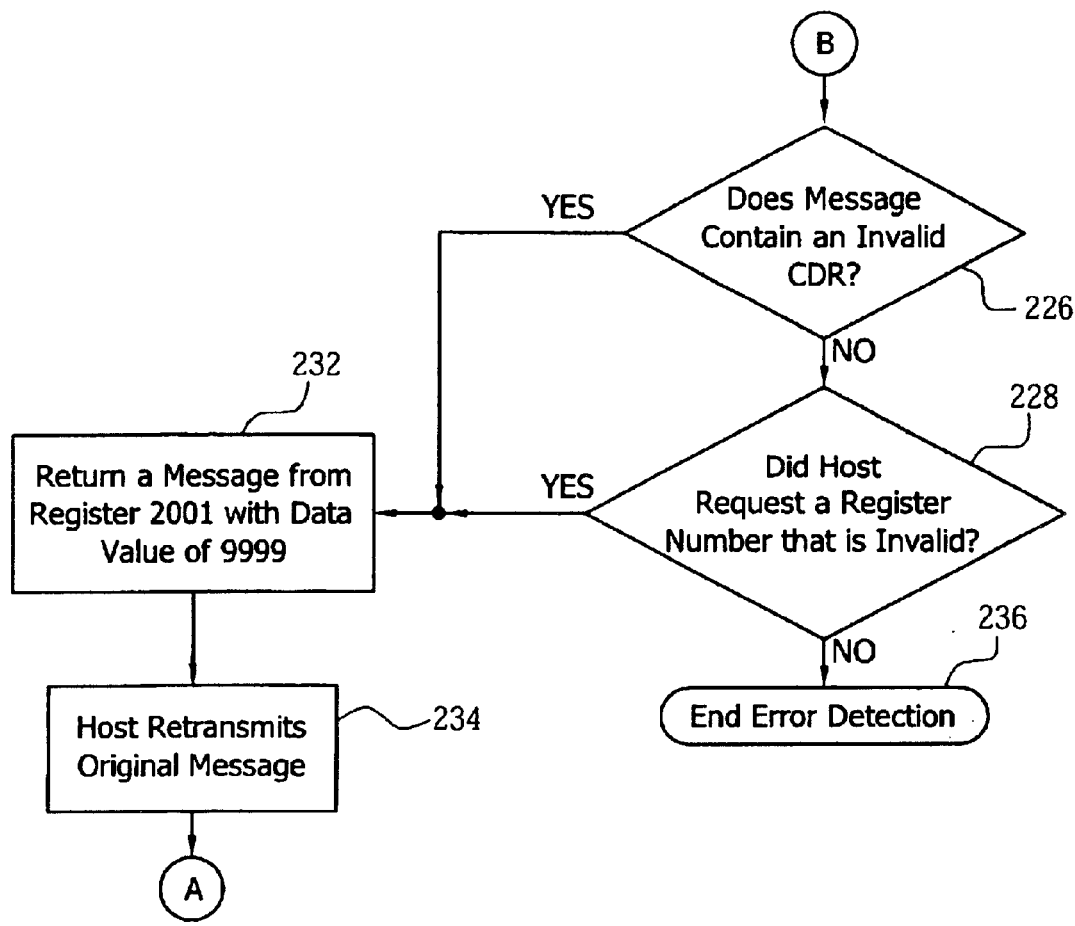

The incorporation of error detection and correction means increase the reliability of the system. Predetermined responses to detected errors result in predetermined actions. Some register addresses or data values are designated to indicate the detection of an error or request retransmission of a command or a response. FIG. 5a illustrates a flow chart of the response to an error in the message 60. When a message 60 is received it is examined for errors. If the message 60 is deemed corrupt in step 200, no action is taken based upon the information contained in the message 60, as indicated in step 202. If no error exists, as decided in step 204, the message 60 is processed in step 206 and the next scan is begun in step 224. If it is determined in step 204 that the message 60 contains an error, a decision is made as to whether the message 60 contains multiple errors or a single point error in step 208. A message 60 having multiple errors is treated as if it has a CDR error in step 210.

For single point errors, the nature of the error is identified and an appropriate response provided. The single point errors assume all other conditions are valid. Those skilled in the art will recognize that the order of the decision steps is insignificant. If an attempt was made by the host 28 to write to a read-only register in step 212, then the module 30 returns a message 60 containing the original CFM with the DFM reflecting the contents of the register in step 214. If the host 28 sends register data that is invalid or out-of-range in step 216, then the module 30 returns a message 60 containing the original CFM with the DFM clamped to the closest limit in step 218. If the module 30 fails to echo a write message in step 220, then the host 28 chooses whether to resend the original message 60 or ignore the error and send a new message in step 222. The remaining errors produce the same response. If the message contains an invalid CDR checkword in step 226, or the host 28 sends an invalid register number in step 228, then a message 60 is returned from register number 2001 with DFM containing the value 9999 in step 232. Those skilled in the art will recognize that the register number and value denoting this error can vary without interfering with the advantages of invention. Upon receipt of a transmission from the module 30 with a register number of 2001 and data of 9999, then the host 28 repeats the previous message 60 in step 234. If the module 30 receives a message 60 with a register number of 2001 and data value of 9999 from the host 28, then the module retransmits the original message 60 in step 240. After retransmission, that communication exchange is closed. Any set multiplexed data system fault (bus fault loss of clock, frame length error, etc.) is deemed a loss of communications with the host 28. In the event of the loss of communications, a notification is given, e.g., the appropriate indicators 50, 52, 54 on the module 30 illuminate. If the module 30 is in a continuous scan mode when the communication loss occurs, then the module 30 remains in the continuous scan mode. If the module 30 is in a single scan mode when the communication loss occurs, then the module 30 transitions to the continuous scan mode.

In either the continuous scan or single scan mode, the module 30 transitions to the limits currently loaded at the beginning of a new cycle of data processing when communications are lost. When the module 30 reestablishes communications with the host 28, the module 30 remains in the continuous scan mode and ceases annunciating loss of communications. The module 30 also sets a flag in a register denoting the loss of communications. To clear the loss of communications notice, the host 28 must reset this flag. If the module 30 is not actively scanning and a communication fault occurs, the module 30 starts processing data in the continuous scan mode.

The communication speed of the network depends on a number of factors including whether the data is multiplexed and the configuration of the physical layer hardware. Accordingly, it is preferred not to base a determination of the loss of communications by counting the number of erroneous messages. Some serial multiplexed data system host 28 interface cards can only change the data to 16 serial multiplexed data system addresses at a time. This operation is due to a 16-bit interface to the memory in these cards and the asynchronous interface between these cards and the systems they are connecting. A personal computer basedapplication could change data for 16 addresses and then get interrupted before it could write the data for the remaining 16 addresses in the module 30. In this scenario, the data for the 32 addresses for the module 30 contains incomplete data and CDR errors. The module 30, not knowing why the message is corrupt, would ignore the message. Networks that have very fast clocks and no multiplexed data accumulate many more errors than networks with slower clock rates and/or multiplexed data. Because many more scenarios like this one exist, the loss of communication able to incorrect message packets is based on time and not the number of incorrect message packets received.

Accordingly, a method and apparatus for data table multiplexing on a serial multiplex data system has been shown and described. The method used to transfer this data is a software data multiplexing protocol which uses the identical address space on two sequential data channels to send a message containing a command for a specific register on the first channel and the associated data on the second channel. The method and apparatus utilizes the previous physical layer protocol and is capable of coexisting with previous systems. Multiple bit addresses within a time multiplexed data stream are assigned functions such as register number, data, and error detection. This establishes a data transfer frame that is used to multiplex data between a host and a module.

While only one embodiment has been shown and described, it will be understood that it is not intended to limit the disclosure, but it is intended to cover all modifications and alternate methods falling within the spirit and the scope of the invention as defined in the appended claims.

What is claimed is:

1. A method for transferring large amounts of complex data between a data link module and a host across a bit level network, said method comprising the steps of:

(a) configuring a channel set to said data link module;

(b) configuring a frame address to said data link module;

(c) sending a multi-bit message from said host to said data link module, said multi-bit message including a message command segment on a first channel of said channel set at said data link module frame address and a message data segment on a second channel of said channel set at said data link module frame address, said message command segment including a register operand and at least either of a read request or a write request;

(d) accessing a register in said data link module specified in said register operand as a specified register and reading a value from said specified register as a read value in response to said read request or writing said message data segment to said specified register in response to said write request;

(e) sending, on a first channel of said channel set at said data link module frame address, a reply from said data link module to said host said reply including a reply command segment equal to said message command segment and on a second channel of said channel set at said data link module frame address, a reply data containing said read value in response to said read request or being equal to said message command segment in response to said write request.

2. A method for transferring large amounts of complex data between a data link module and a host across a bit level network, said method comprising the steps of:

(a) configuring a channel set having at least two bit level time division multiplexed channels to said data link module;

(b) configuring a frame address to said data link module;

(c) sending a message from said host to said data link module, said message including a message command segment on a first channel of said channel set at said data link module frame address and a message data segment on at least one other channel of said channel set at said data link module frame address, said message command segment including a register operand and at least either of a read request or a write request;

(d) accessing a register in said data link module specified in said register operand as a specified register and reading a value from said specified register as a read value in response to said read request or writing said message data segment to said specified register in response to said write request;

(e) sending a reply from said data link module to said host, said reply including a reply command segment equal to said message command segment on a first channel of said channel set at said data link module frame address and a reply data segment containing said read value in response to said read request or being equal to said message command segment in response to said write request on at least one other channel of said channel set at said data link module frame address.

* * * * *